H. HODGE.
MACHINE FOR PARING THE EDGES OF BOOTS AND SHOES.

No. 44,688. Patented Oct. 11, 1864.

Witnesses:
Frederick Curtis.
H. R. Hale Jr.

Inventor:
Horatio Hodge
by his attorney
R. H. Eddy

UNITED STATES PATENT OFFICE.

HORATIO HODGES, OF LYNN, MASSACHUSETTS, ASSIGNOR TO HIMSELF AND DAVID WACEY, OF SAME PLACE.

MACHINE FOR PARING THE EDGING OF BOOTS AND SHOES.

Specification forming part of Letters Patent No. 44,688, dated October 11, 1864.

*To all whom it may concern:*

Be it known that I, HORATIO HODGES, of Lynn, in the county of Essex and State of Massachusetts, have invented a new and useful Rotary Cutter, or Implement for Dressing or Paring the Edges of Soles and Heels of Boots or Shoes; and I do hereby declare the same to be fully described in the following specification and represented in the accompanying drawings, of which—

Figure 1:
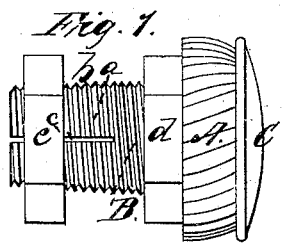
Figure 2:
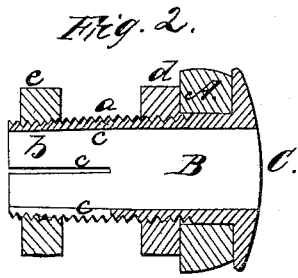
Figure 3:
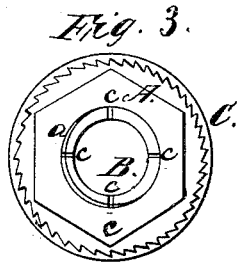

Figure 1 is a side view, Fig. 2 a longitudinal section, and Fig. 3 a rear end view, of it complete.

In the said drawings, A denotes a burr or cutter wheel, formed with teeth or serrations around its circumference and made separate from and so as to encircle a hollow shaft or tube, B, having at one end, and next to the burr, an annular disk or thin guide, C. On the external surface of the shaft or shank B a screw, $a$, is cut, and extends from the burr to the rear end of the shaft or shank, as shown in the drawings. The shank for about half its length is cylindrical, the remainder of it being slightly tapering, as shown at $b$, and sawed lengthwise, or having four or any other suitable number of saw-kerfs, $c\ c\ c\ c$, arranged in it in manner as represented in the drawings. A nut, $d$, is screwed on the cylindrical part of the shank and against the burr, and serves to confine such burr on the shank and against the guard or guide C. There is also another nut, $e$, which screws on the tapering part of the shank, and while being screwed thereon serves to create a lateral contraction of the shank, such as would compress it upon and fasten it to a mandrel when extending into the shank. The object of the nut $e$ and the saw-kerfs and the tapering part of the shank is to enable the implement to be affixed to a mandrel for the purpose of being put in revolution thereby.

When in use, the implement is to be in rapid rotation, the sole-edge to be pared or dressed being brought against the cutting-teeth of the burr. At the same time the edge or periphery of the guide or guard C should be inserted in the groove, which is between the sole and the upper leather of the boot or shoe, it being understood that my said implement is intended for dressing or paring the edge of an outer sole or a heel after such sole or heel may have been fixed to the upper of a boot or shoe. The guide or guard, while the edge of the sole may be in the act of being reduced, will not only guide the burr correctly along the said edge, but will guard the upper-leather from being cut or injured by the burr. The width and form of the outer edge of the burr may be such as circumstances may require. By having the burr separate from the shank such burr at any time may be removed from the shank and another of a different width or form may be applied to such shank and be used with the guard or guide. Thus one guard or guide and one shank will answer for a set or series of the burrs of different widths.

I claim—

1. The rotary sole-edge cutter, or combination of the annular burr and the guard or guide, arranged together and on a shaft, as specified.

2. The combination of the tubular split tapering shank and its screw and nuts with the bar and the guide or guard, the whole being arranged together substantially as specified.

HORATIO HODGES.

Witnesses:
F. P. HALE, Jr.,
GEO. D. NOYES.